(12) United States Patent
Makhija et al.

(10) Patent No.: US 11,675,571 B1
(45) Date of Patent: Jun. 13, 2023

(54) RESTRUCTURING ENTERPRISE APPLICATION

(71) Applicant: NB Ventures, Inc., Clark, NJ (US)

(72) Inventors: Subhash Makhija, Westfield, NJ (US); Huzaifa Matawala, Princeton, NJ (US); Shivendra Singh Malik, Vasco-da-Gama (IN); Wael Gendy Yousef Abdo, Bridgewater, NJ (US); John Fawzy Gouda Hakeem, Ledgewood, NJ (US); Bicheng Xiao, Secaucus, NJ (US)

(73) Assignee: NB Ventures, Inc., Clark, NJ (US)

( * ) Notice: Subject to any disclaimer, the term of this patent is extended or adjusted under 35 U.S.C. 154(b) by 0 days.

(21) Appl. No.: 17/563,197

(22) Filed: Dec. 28, 2021

(51) Int. Cl.
| G06F 9/44 | (2018.01) |
| G06F 8/35 | (2018.01) |
| G06F 8/41 | (2018.01) |
| G06F 8/75 | (2018.01) |
| G06F 8/74 | (2018.01) |

(52) U.S. Cl.
CPC ............... *G06F 8/35* (2013.01); *G06F 8/42* (2013.01); *G06F 8/433* (2013.01); *G06F 8/74* (2013.01); *G06F 8/75* (2013.01)

(58) Field of Classification Search
None
See application file for complete search history.

(56) References Cited

U.S. PATENT DOCUMENTS

| 11,137,988 | B2 * | 10/2021 | Ueda | G06F 8/35 |
| 2012/0005648 | A1 * | 1/2012 | Berg | G06F 8/35 |
| | | | | 717/105 |
| 2021/0109728 | A1 * | 4/2021 | Du | G06F 8/35 |
| 2021/0165641 | A1 * | 6/2021 | Gilpin | G06F 8/76 |
| 2022/0179651 | A1 * | 6/2022 | Qiu | G06F 9/547 |

* cited by examiner

*Primary Examiner* — Qamrun Nahar
(74) *Attorney, Agent, or Firm* — BrownWinick Law Firm; David Breiner

(57) ABSTRACT

The present invention provides a system and method for restructuring of one or more applications. The invention includes a syntax data library having components enabling creation of one or more logical flow blocks by the AI engine. The logical flow blocks are structured on an extension tool interface to restructure the one or more applications for executing one or more SCM operations.

30 Claims, 13 Drawing Sheets

300

| UI Control | | | | |
|---|---|---|---|---|
| Input | Name block_type | | Publish Changes | |
| Field | | PO Number | Created On | |
| Type | Inputs ▼ | PO Name | Currency | |
| Colour | Automatic▼ inputs | Contract No. | | |
| BlockChain | No connections ▼ | | | |
| Connectors | Tooltip " ⬚ " | | | |
| Initiate | Help url " ⬚ " | | | |
| Success | Colour hue: 230 | LineItem | Line Item Desc | Qty |
| IOT | | LineItem | Line Item Desc | Qty |
| Application | | LineItem | Line Item Desc | Qty |
| PO | | | | |
| Invoice | | <<API>> | (<<PO.Item.Price>>+ | |
| Conversion | Submit | <<Currency Conversion>> | <<PO.Item.Qty>>) * CurrencyConversionValue | |
| Math | | | | |
| Conditional | | | | |

XML   DEFINITION   GENERATOR   FRAGMENT   PREVIEW   ANNOTATION

```
1   < xml xmlns = "https://developers.gep.com/extension tool/xml">
2     <block type = "factory_base" id ="{lma.QSH}G"90zhDj.vb_"deletable="false"movable="false" x="10" y="10">
3       <mutation connections="NONE">
4       </mutation>
5       <field name="NAME">block_type</field>
6       <field name="INLINE:>AUTO</field>
7       <field name="CONNECTIONS">NONE</field>
8       <value name="TOOLTIP">
9         <block type ="text" id="Eo"[0BcF%Dyy]%3nymu("deletable"="false" movable="false">
10          <field name="TEXT">
11        </field>
12        </block>
13      </value>
14      <value name="HELPURL">
15        <block type ="text" id="+|?;u,#.wW{ } f20x (wj)"    deletable="false" movable="false">
16          <field name="TEXT">
17        </field>
18        </block>
19      </value>
20      <value name="COLOUR">
```

| UI Control | Name [state_delete_v0.2.5] |
| --- | --- |
| Input | Inputs Value input [scopeid] |
| Field | fields [left ▼] |
| Type | type [String] |
| Colour | Value input [storeid] |
| BlockChain | fields [left ▼] |
| Connectors | type [String] |
| Initiate | Value input [path] |
| Success | fields [left ▼] |
| IOT | type [String] |
| Application | Value input [Value] |
| PO | fields [left ▼] |
| Invoice | type [String] |
| ... | [Automatic ▼] inputs |
| Conversion | [No connections ▼] |
| UOM | |
| Currency | Tooltip "[Extends the store value, given the scope id and th..]" |
| Math | |
| String | Help url "[http://kb.gep.com/0x1/vp/ui-kernel/data fram..]" |
| Conditional | |
| | Colour hue: [255] |

XML  DEFINITION  GENERATOR  FRAGMENT  PREVIEW  ANNOTATION

```
1    Extension tool ['state_delete_V0_2_5'] = {
2      init: function () {
3         this.appendValueInput ("scopeId")
4            .setCheck("String");
5         this.appendValueInput ("storeId")
6            .setCheck("String");
7         this.appendValueInput ("path")
8            .setCheck("String");
9         this.appendValueInput ("Value")
10           .setCheck("String");
11        this.setColour(255);
12     this,setTooltip{"Extends a store value, given the scope Id and the new value to add."};
13     this.setHelpurl{"http://kb.gep.com/0x1/vp/ui-kernel/data-framework/state/mutators/extends"};
14      }
15   };
```

| UI Control | |
| --- | --- |
| Input | Name [state_delete_v0.2.5] |
| Field | Inputs Value input [scopeid] |
| Type | fields [left ▼] |
| Colour | type [String] |
| BlockChain | Value input [storeid] |
| Connectors | fields [left ▼] |
| Initiate | type [String] |
| Success | Value input [path] |
| IOT | fields [left ▼] |
| Application | type [String] |
| PO | Value input [Value] |
| Invoice | fields [left ▼] |
| ... | type [String] |
| Conversion | [Automatic ▼] inputs |
| UOM | [No connections ▼] |
| Currency | |
| Math | Tooltip " [Extends the store value, given the scope id and th..] " |
| String | |
| Conditional | Help url " [http://kb.gep.com/0x1/vp/ui-kernel/data fram..] " |
| | Colour hue: [255] |

XML  DEFINITION  GENERATOR  FRAGMENT  PREVIEW  ANNOTATION

```
1  {
2    "0": "scopeId",
3    "1": "storeId",
4    "2": "path",
5    "3": "value"
6  }
```

FIG. 3B

RESTRUCTURING ENTERPRISE APPLICATION

BACKGROUND

1. Technical Field

The present invention relates generally to enterprise applications developed with codeless platform. More particularly, the invention relates to systems and methods for restructuring of one or more applications.

2. Description of the Prior Art

Enterprise applications support multiple functions for any organization depending on the requirements. These requirements keep changing from one organization to another and each organization requires certain customization capabilities. However, it is impractical for a service provider to accommodate such customization of the application every time a new entity raises a distinct operational requirement. Since, every organization may have a unique operational requirement, it is tedious to incorporate required changes in the enterprise application (EA) for the service provider. Further, the service provider may have to redesign the structure of the application to accommodate such requirements which is extremely time consuming, and in some instances, it may impact other functions being executed through the enterprise application due to processing errors. Redesigning of the application may also require halting of other processes in the EA to avoid conflict with existing process flows especially in case of complex EA such as procurement and supply chain applications. In addition to the above, any restructuring of the application would require a skilled developer to modify existing complex EA scenarios at system backend which may is tedious as the developer may understand only certain sections of the EA.

Even with codeless development of applications to overcome some of the above problems the architecture remains unsupportive in multiple aspects. Moreover, it is impossible to pre-empt every possible functionality required by an organization. Even with application supported through codeless development platform, it is the dynamically changing operational requirements that drive the structuring of the EA and related flows for enabling execution of the required operation. Certain aspects, of the EA functions needs to be driven by the organization itself as the service provider may not be able to deliver all such required process flow modification swiftly every time. However, the applications developed with codeless platform also have limited capabilities and do not provide any mechanism for enabling the organization itself to create or recreate workflows based on dynamically changing requirements. Some application may use reusable code objects for executing codeless development, but these codes are restricted in their functionality due to underlining architecture. None of the prior arts address the structural complexity and technical issues in executing functions through an enterprise application that are initiated by an organizational user through the codeless platform supported by the service provider with limited capabilities.

In view of the above problems, there is a need for a platform architecture, system and method that enable restructuring of enterprise applications and overcome the problems associated with the prior arts.

SUMMARY

According to an embodiment, the present invention provides a system and method of restructuring one or more applications. The method includes determining by a processor, a requirement to restructure the one or more applications based on a request received at a server to execute at least one SCM application operation, identifying one or more logical flow blocks to be invoked by the processor for creating one or more SCM application operation logical fragments configured to restructure the one or more applications, triggering a syntax data library by the processor, to load one or more data library components on an extension tool interface for structuring the one or more logical flow blocks to create the one or more SCM application operation logical fragments, and restructuring the one or more applications by the one or more SCM application operation logical fragments to enable execution of the at least one SCM application operation.

In an embodiment, the extension tool interface is a graphical user interface (GUI) that includes one or more input components for receiving one or more inputs from a user indicating one or more logical flow blocks to be structured within the GUI for creating the one or more SCM application logical fragment to restructure the one or more applications, and one or more graphical data elements for rendering within the GUI, one or more logical flow blocks, one or more syntax library components and at least one output obtained by processing of the one or more inputs by the one or more processors.

In an embodiment, the syntax data library comprising the one or more data library components configured to structure one or more logical flow blocks is created by one or more supply chain domain models, wherein the one or more supply chain domain models are conceptual object models configured to incorporate behavior and data related to one or more supply chain applications.

In an embodiment, the one or more supply chain domain models is represented by a supply chain class structure for conceptual modeling of the one or more applications to be structured wherein the supply chain class structure includes one or more code templates configured for creating a plurality of objects, one or more attributes, one or more operations and one or more relationships between the objects.

In an embodiment, the invention provides a platform architecture for codeless development of one or more applications. The architecture includes a plurality of configurable components interacting with each other in a layered architecture, a customization layer configured to customize the one or more SCM application based on at least one operation to be executed, an application layer interacting with the customization layer through one or more configurable components of the plurality of configurable components wherein the application layer is configured to organize at least one application service of the one or more SCM application, a shared framework layer communicating with the application layer through one or more configurable components of the plurality of configurable components wherein the shared framework layer is configured to fetch shared data objects for enabling execution of the at least one application service. The architecture includes a foundation layer configured for infrastructure development through one or more configurable components of the plurality of configurable components wherein the foundation layer communicates with the shared framework layer for enabling fetching of shared data objects, a data layer communicating with the foundation layer through one or more configurable components of the plurality of configurable components wherein the data layer is configured to manage database native queries mapped to the at least one operation and a process orchestrator configured to enable interaction of the plurality of configurable components in the layered architecture for executing the at least one operation and develop the one or more SCM application.

In a related embodiment, the extension tool of the present invention enables the one or more processor to change behavior of the plurality of configurable components based on the one or more logical flow blocks to restructure the one or more applications. The restructuring system and method triggers one or more machine learning techniques, Natural language processing (NLP) techniques and Artificial intelligence techniques deployed by one or more applications for processing data at the backend in the enterprise applications. The NLP may include graph theory and search algorithms for identifying relevant logical flow blocks based on the one or more SCM application operation to be executed.

In an advantageous aspect, the platform architecture is a layered architecture structured to execute a plurality of complex SCM enterprise application operations in an organized and less time-consuming manner due to faster processing as the underlining architecture is appropriately defined to execute the operations through shortest path. Further, the platform architecture enables secured data flow through applications and resolution of code break issues without affecting neighboring functions or application.

In another advantageous aspect, the present invention utilizes Machine Learning algorithms, prediction data models, artificial intelligence-based processing of syntax data library for execution of one or more application operations.

BRIEF DESCRIPTION OF THE DRAWINGS

The disclosure will be better understood and when consideration is given to the drawings and the detailed description which follows. Such description makes reference to the annexed drawings wherein:

FIG. 3 is an extension tool interface showing creation of a logical flow block and corresponding xml code in accordance with an example embodiment of the invention.

FIG. 3A is an extension tool interface showing creation of logical flow block and corresponding definition code in accordance with an example embodiment of the invention.

FIG. 3B is an extension tool interface showing creation of logical flow block and corresponding generator code in accordance with an example embodiment of the invention.

DETAILED DESCRIPTION

Figure 1:
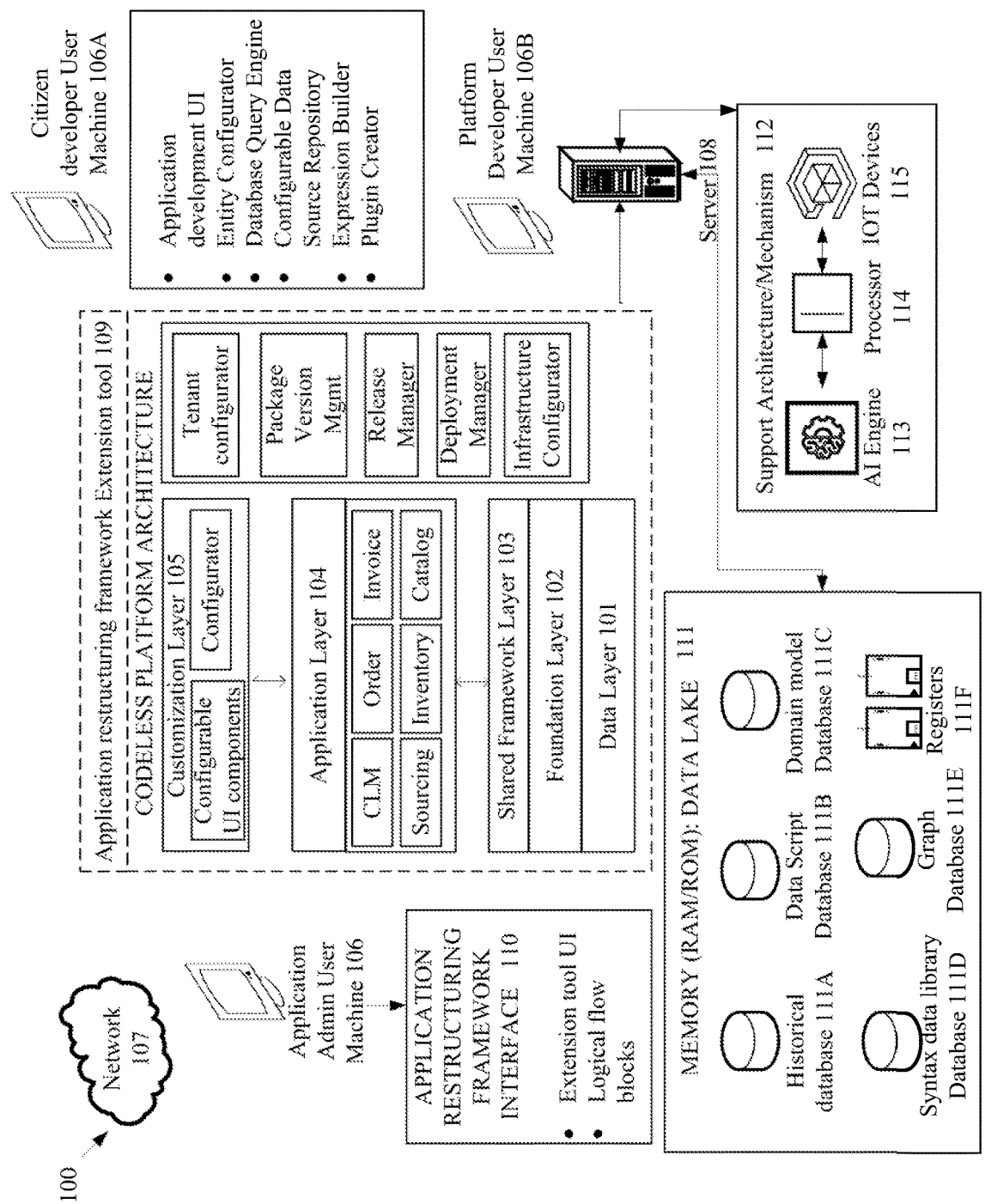
FIG. 1 is a system architecture diagram for restructuring one or more applications in a codeless platform according to an embodiment of the invention.

Described herein are the various embodiments of the present invention, which includes system and method for restructuring of one or more applications, codeless development application architecture for enterprise application including supply chain management applications.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "extension tool," "logical flow block," or "syntax data library", and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to system and method for restructuring of one or more applications.

Referring to FIG. 1, a system 100A for restructuring one or more applications is provided in accordance with an embodiment of the invention. The system 100 includes a layered codeless platform architecture having a data layer 101, a foundation layer 102, a shared framework layer 103, an application layer 104, and a customization layer 105. Each layer of the architecture includes a plurality of configurable components interacting with each other to execute at least one operation of the SCM enterprise application. It shall be apparent to a person skilled in the art that while FIG. 1 provides certain configurable components, the nature of the components itself enables redesigning of the platform architecture through addition, deletion, modification of the configurable components and their positioning in the layered architecture. Such addition, modification of configurable components depending on the nature of the architecture layer function shall be within the scope of this invention.

The system 100 also includes one or more entity machines including an application admin user machine 106, a citizen developer user machine 106A and a platform developer user machine 106B. The system 100 includes a network 107 configured for communicating with one or more elements of the system for restructuring the one or more applications. The system 100 includes a server 108 configured for receiving data and instructions from the entity machines (106, 106A, 106B). The system 100 includes application restructuring framework extension tool 109 having a plurality of support architecture components for performing various prediction and analysis through AI engine with multiple functions including structuring of one or more data blocks on extension tool interface, processing logical blocks, Artificial intelligence (AI) based processing of datasets, creation of one or more data models configured to process different parameters etc.

In an embodiment the entity machines (106, 106A, 106B) may communicate with the server 108 wirelessly through communication interface, which may include digital signal processing circuitry. Also, the entity machines (106, 106A, 106B) may be implemented in a number of different forms, for example, as a smartphone, computer, personal digital assistant, or other similar devices.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The underlying codeless development architecture of the system enables more secured processes.

In an embodiment the server 108 of the invention may include various sub-servers for communicating and processing data across the network. The sub-servers include but are not limited to content management server, application server, directory server, database server, mobile information server and real-time communication server.

In example embodiment the server 108 shall include electronic circuitry for enabling execution of various steps by one or more processors. The electronic circuitry has various elements including but not limited to a plurality of arithmetic logic units (ALU) and floating-point Units (FPU's). The ALU enables processing of binary integers to assist in formation of at least one table of syntax where the domain models implemented for domain characteristic prediction are applied to the data table for obtaining logical data blocks for restructuring of one or more applications. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low-speed interface connecting to low-speed bus and storage device. Each of the components of the electronic circuitry, are interconnected using various busses, and may be mounted on a common motherboard or in other manners as appropriate. The processor can process instructions for execution within the server 108, including instructions stored in the memory or on the storage devices to display graphical information for a graphical user interface (GUI) on an external input/output device, such as display coupled to high-speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

The one or more processors may be implemented as a chipset of chips that include separate and multiple analog and digital processors. The processor may provide coordination of the other components, such as controlling user interfaces, applications run by devices, and wireless communication by devices. The Processor may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user and convert them for submission to the processor. In addition, an external interface may be provided in communication with processor, so as to enable near area communication of device with other devices. External interface may provide, for example, for wired communication in some implementations, or for wireless communication in other implementations, and multiple interfaces may also be used.

In an example embodiment, the system of the present invention includes a front-end web server communicatively coupled to at least one database server, where the front-end web server is configured to process input received through the extension tool interface by the one or more processors based on one or more domain models and applying an AI based dynamic processing logic to automate application restructuring actions through the extension tool.

In a related embodiment, the extension tool is a programming tool configured as per the application domain for enabling an application user/admin user to structure one or more applications depending on the process flows required to execute one or more SCM application operation. The extension tool may be any editor that is extended with plugins as per domain requirement. It provides an integrated development environment with GUI for enabling domain specific restructuring of applications. The extension tool is configured for creating one or more domain specific syntax data library to structure one or more data flow blocks for executing one or more SCM application operation through restructuring of one or more SCM application.

The application user or application admin user interface 106 of the system 100 includes an application restructuring framework interface 110 having extension tool UI and logical flow blocks rendered on the extension tool UI for restructuring one or more applications.

The citizen developer user interface 106A of the system 100 includes an application development UI, entity configurator, data base query engine, configurable data source repository, expression builder and plugin creator.

In an embodiment, the system 100 includes a memory data store/data lake 111 configured for storing data related to enterprise application, extension tool for restructuring one or more applications etc. Further, the system 100 includes a support architecture 112 configured for enabling interacting of extension tool 109, memory data store 111, entity machines (106, 106A, 106B) and server 108. The support architecture 112 includes an AI engine 113 coupled to one or more processors 114 configured for processing one or more SCM application operations through one or more applications restructured by a user via the extension tool 109. The support architecture 112 also includes a plurality of IOT devices 115 configured to capturing, transmitting, receiving data and instructions from one or more computing devices. The plurality of IOT devices 115 is configured to provide the inputs to the server 108 on initiation of the SCM action wherein the IOT devices include sensor, mobile, camera, Bluetooth, RF tags and similar devices or combination thereof. Further, the inputs may include but is not limited to inventory management data or warehouse management data or data related to one or more SCM application operation etc.

In an embodiment, the underlying codeless platform architecture of the present invention enables one or more components of the extension tool 109 to invoke changes in the configurable components of the codeless platform for changing behavior of the one or more applications. The configurable components enable an application developer user/a citizen developer user, a platform developer user and a SCM application user working with the SCM application to execute the operations to code the elements of the SCM through configurable components. The SCM application user or admin user triggers and interacts with the customization layer 105 for execution of restructuring operation through application user machine 106, a function developer user or citizen developer user triggers and interacts with the application layer 104 to develop the SCM application for execution of the operation through citizen developer machine 106A, and a platform developer user through its computing device 106B triggers the shared framework layer 103, the foundation layer 102 and the data layer 101 to structure the platform for enabling codeless development of SCM applications thereby providing underlying architecture for restricting of one or more applications.

In an embodiment the present invention provides one or more SCM enterprise application with an admin user application UI and a citizen developer user application UI for structuring the interface to carry out the required operations.

The layered platform architecture enables a developer user to write code in a true layered manner, so developing each layer becomes a delightful and an easier proposition for developers and system builders/architects. The layered platform further reduces complexity as the layers are build one upon another thereby providing high levels of abstraction, making it extremely easy to build complex features for the SCM application.

In one embodiment, the system with the codeless platform provides the cloud agnostic data layer 101 as a bottom layer of the architecture. This layer provides a set of microservices that collectively enable discovery, lookup and matching of storage capabilities to needs for execution of operational requirement. The layer enables routing of requests to the appropriate storage adaptation, translation of any requests to a format understandable to the underlying storage engine (relational, key-value, document, graph, etc.). Further, the layer manages connection pooling and communication with the underlying storage provider and automatically scales and de-scaling the underlying storage infrastructure to support operational growth demands. The configurable components of the data layer enable execution of operations related to data layer.

In an embodiment the system provides the foundation layer 102 on top of the data layer 101 of the codeless platform architecture. This layer provides a set of microservices that execute the tasks of managing code deployment, supporting code versioning, deployment (gradual roll out of new code) etc. The layer collectively enables creation and management of smart forms (and templates), framework to define UI screens, controls etc. through use of templates. Seamless theming support is built to enable specific form instances (created at runtime) to have personalized themes, extensive customization of the user experience (UX) for each client entity and or document. The set of microservices of foundation layer are the only way any higher layer microservice can talk to the data layer microservices. Further, machine learning techniques auto-scale the platforms to optimize costs and recommend deployment options for entity such as switching to other cloud vendors etc.

In an embodiment, the system provides the shared framework layer 103 on top of the foundation layer 102 of the codeless platform architecture. This layer provides a set of microservices that collectively enable authentication (identity verification) and authorization (permissioning) services. The layer supports cross-document and common functions such as rule engine, workflow management, document approval (built likely on top of the workflow management service), queue management, notification management, one-to-many and many-to-one cross-document creation/management, etc. The layer enables creation and management of schemas (aka documents), and support orchestration services to provide distributed transaction management (across documents). The service orchestration understands different document types, hierarchy and chaining of the documents etc.

In an embodiment, the system 100 provides the application layer 104 on top of the shared framework layer 103 of the codeless platform architecture. The application user or admin user of the platform will interact with the application layer 103 for structuring the SCM application. This is also the first layer, that defines SCM specific documents such as requisitions, contracts, orders, invoices etc. This layer provides a set of microservices to support creation of documents (requisition, order, invoice, etc.), support the interaction of the documents with other documents (ex: invoice matching, budget amortization, etc.) and provide differentiated operational/functional value for the documents in comparison to a competition by using artificial intelligence and machine learning. This layer also enables execution of complex operational/functional use cases involving the documents.

In an embodiment, the system 100 provides the customization layer 105 as the topmost layer of the codeless platform architecture above the application layer 104. This layer provides microservices enabling end users to write codes to customize the operational flows as well as the end user application UI to execute the operations of SCM. The end user can orchestrate the objects exposed by the application layer 104 to build custom functionality, to enable nuanced and complex workflows that are specific to the end user operational requirement or a third-party implementation user.

In an embodiment, the codeless platform of the system 100 includes components such as tenant configurator, package version management, release manager, deployment manager and infrastructure configurator as part of package management. These components provide window for citizen developer and platform developer to release the packages and provide visibility of the deployment pipeline. The tenant configurator enables deployment of packages to one or more clients across environments. It provides ability to create and manage details of customers through UI. It gives deployment experience through projects and environments to support the tenant concept. The Version management component manages multiple versions of the packages and changes made by application developers and platform developers. The component provides UI to look at multiple versions of the package and compare versions. It manages minor and major versions. The release manager component is responsible for managing, planning, scheduling, and controlling delivery throughout the release lifecycle using other sub-components and for Orchestrating entire pipeline with automation. The deployment manager component configures and run delivery workflows for applications and platforms. It Creates standardized deployment process to deploy predictable, high-quality releases. The component automates workflows, including versioning, application package generation, artifact management, and package promotion to different stages in the workflow. The infrastructure configurator component is responsible to provision services and database repositories as per application and loads. The component supports automation to provision infrastructure as per release and version.

In an exemplary embodiment, apart from application user interface, output of the system is exposed as API for third party digital platforms and applications. The API is also consumed by bots and mobile applications.

Figure 1A:
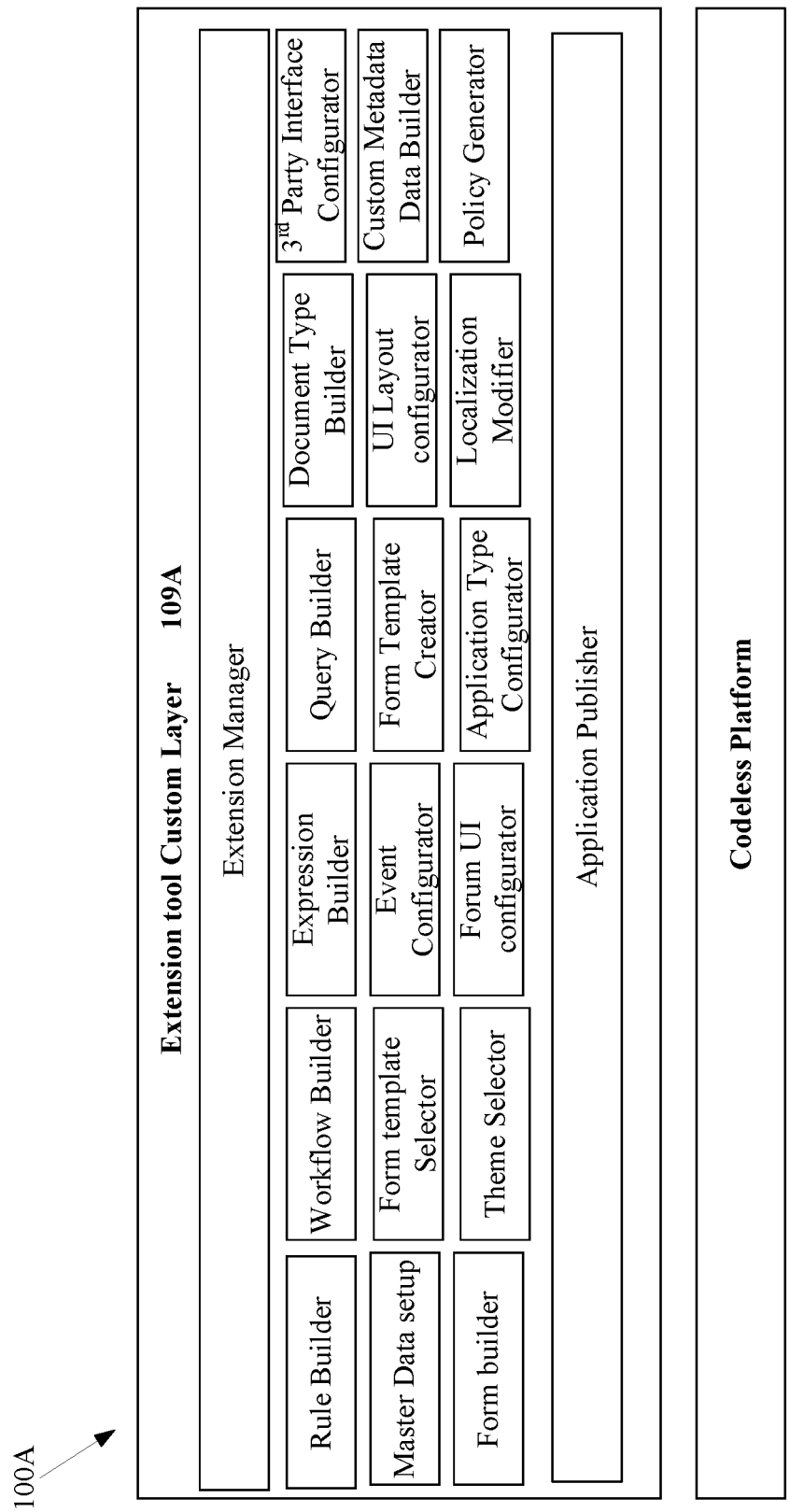
FIG. 1A is a layered architecture diagram showing extension tool layer on the codeless platform for invoking one or more configurable components in accordance with an embodiment of the invention.

Referring to FIG. 1A, a layered architecture diagram 100A of the system for restructuring one or more application is provided in accordance with an embodiment of the invention. The diagram 100A shows an extension tool custom layer 109A on top of the codeless platform layer enabling the extension tool to change including modify, delete, and add configurable components of the codeless platform layer for enabling restructuring of one or more application by changing behavior of the application as per requirement by the application admin user. The extension tool custom layer 109A includes a plurality of components including but not limited to application publisher, Form builder, theme selector, forum UI configurator, application type configurator, localization modifier, policy generator, master data setup, Form template selector, event configurator, form template creator, UI layout configurator, custom metadata data builder, rule builder, workflow builder, expression builder, query builder, document type builder, third party interface configurator and extension manager.

Figure 1B:
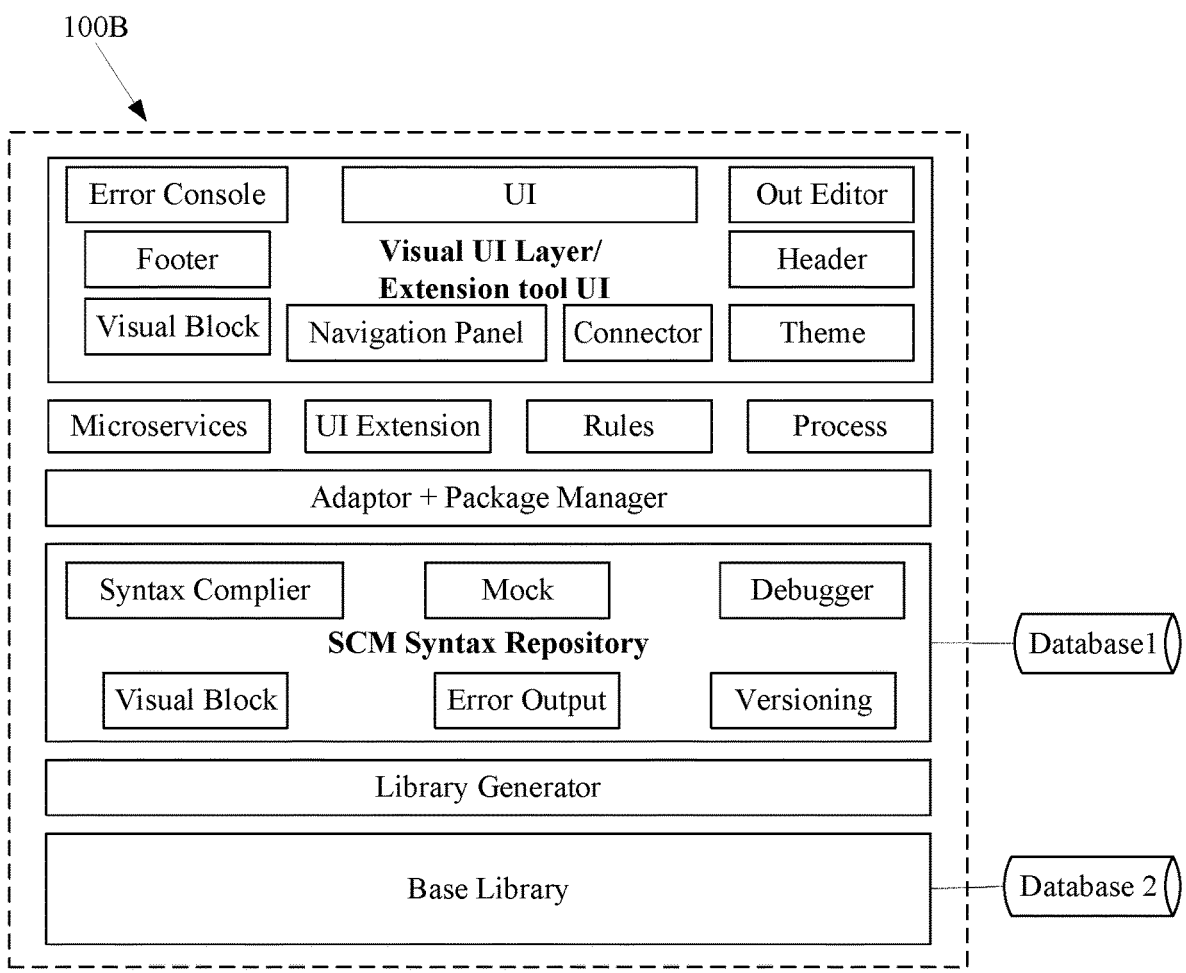
FIG. 1B is a block diagram of an extension tool of the system in accordance with an example embodiment of the invention.

Referring to FIG. 1B, an extension tool 100B of the system for restructuring one or more application is shown in accordance with an example embodiment of the invention. The extension tool 100B includes base library, library generator for logical flow blocks, supply chain management (SCM) syntax repository for storing one or more components of the syntax data library, syntax compiler, mock, debugger, visual block, error output, versioning. The extension tool 100B also includes adapter, package manager, microservices, UI extension, rules, and process. The extension tool 100B includes an extension tool UI like a visual studio UI layer having error console, User interface (UI), out editor, footer, header, visual block for UI layer, navigation panel, connector, and theme.

In a related embodiment, the base Library includes content predefined of the box blocks provided through programming languages related to mathematical, logical, string manipulation etc. The library Generator enables syntax creation based on SCM requirement, custom logical, application tool groups. The library generator Layer is responsible to generate output as per the targeted programming language like C#, nodeJs. It is also responsible to manage core features connecting to underlying base libraries and managing version between base and custom.

In another related embodiment, the SCM Syntax Repository layer is responsible to manage and generate wrapper using library generator addressed to resolve SCM extension toolsets.

The extension tool UI layer or Visual UI Extension Tool is used to extend codeless platform providing drag and drop features to manage blocks and syntax. Left Panel, Connectors, Editor will help Admin to extend the flow. Navigation panel will showcase syntax and tool sets from gallery. The admin user will be able to publish the changes and manage versions of changes connected to underlying workspace. It includes features like error handing capability providing visual presentation on how rearrange blocks. The Adaptor and Package Manager is the connector between gallery and library and code generator.

In a related embodiment, the system enables end to end flow. It enables selection of application type, configuration of data attributes as required for operation execution. The platform dynamically generates code clocks and database schema based on filed property like type and mandatory etc. Code and queries are generator based on column and repository type, translated using Query language standardized for multiple data stores. System generates multiple user action types.

In an exemplary embodiment, the system with codeless platform provides creation of Seed project that includes common repository and code template project containing all metadata information and applications can be restructured using these code templates. This will enable faster restructuring of applications by admin users. Additional Features required to implement as part of Seed project include project repository as seed for all entity/end user implementations, manage all the entities from single manage interface to decide which entity is going to view what specific data, setting the permission and access control to the application development team to help them maintain and deploy their features and fixes faster and safer for Version control.

In an example embodiment, the system 100 of the present invention includes a memory data store 111 having a plurality of databases as shown in FIG. 1. The data store 111 includes a historical database 111A for storing historical data including but not limited to historical SCM application data, historical logical flow block data, historical data with identifier information and relationship information defining a relationship of one or more data flow blocks with each other as part of the one or more application to execute one or more SCM application operations, historical documents data with plurality of data items etc. The historical database 111A also includes classified historical data related to one or more document, file or function executed through the enterprise application. The one or more processors of the system are configured for performing one or more SCM processing task associated with one or more data scripts generated by bots based on one or more SCM logical flows, one or more SCM data object and AI based processing logic for enabling the processor coupled to an AI engine to execute the data script stored on a data script database 111B for creating the logical flow blocks.

In an embodiment, the system 100 of the present invention provides the historical database configured for storing historical data where the connections of the data in the database are structured on AI based model-driven flows incorporating reference to one or more identifiers to link the data within supply chain.

The data store 111 includes a domain model database 111C having one or more domain models including but not limited to conceptual or particular domain data models. The data store 111 also includes a plurality of SCM related data models that enable processing of data in enterprise application. The data models include graph data models trained on graph structures for semantic queries with nodes, edges and properties to represent and store data. The data models also include a plurality of training models required to process the received input data for identifying relationship with historical data stored in the historical database 111A. The data model also includes relational data model, document data model as relationship models for identification of relationships. The data store 111 also includes a syntax data library database 111D having a plurality of domain specific syntax configured to structure one or more logical flow blocks on extension tool interface.

In an exemplary embodiment, the system for restructuring one or more applications also include blockchain based implementations. The system enables extension tool to extend or change behavior of one or more applications by connecting with blockchain implemented databases. The extension tool may structure logical flow blocks with identifier or security verification process before involving any changes or restructuring of the application. The identifier or verification may be through internet protocol (IP) address, security certificate data etc., and the logical flow block with blockchain implementation includes public key, primary key, to ensure secured communication through a blockchain network for executing the SCM application operations. Further, the blockchain implemented system enables connection of one or more client nodes with one or more server nodes through the blockchain network. The blockchain network includes one or more data blocks connected to each other and configured for storing SCM application data and the blockchain network enables an integrator to integrate the AI engine with one or more external entity systems.

The data store 111 also includes a graph database 111E configured to store nodes and relationships. The graph database 111E is a specialized, single-purpose platform for creating and manipulating graphs. Graphs contain nodes, edges, and properties, all of which are used to represent and store data.

The data store 111 also includes a plurality of registers 111F as part of the memory data store 111 for temporarily storing data from various databases to enable transfer of data by the processors 114 between the databases as per the instructions of the AI engine 113 to enable processing of received input data to identify relationship between one or more data elements of the received input data and historical data before storing the input data as part of the data network with identifiers to enable fetching of the input data on receiving an instruction from the computing device.

The memory data store 111 may be a volatile, a non-volatile memory or memory may also be another form of computer-readable medium, such as a magnetic or optical disk.

The memory store 111 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

In an exemplary embodiment, the data store 111 is configured for storing historical data of documents related to operations including inventory management, delivery management, transportation management, work order management, demand and supply planning, forecast, purchase order and invoice, real-time streams from manufacturing devices and consumer preference in regions, feeds from weather, social sentiments, economic and market indices.

Referring to FIG. 1, the various elements like the support mechanism 112, the memory data store 111 are shown as external connections to the server 108 in accordance with an embodiment of the invention. However, it shall be apparent to a person skilled in the art that these elements may be part to an integrated server system. Also, some of the sub-elements of the support mechanism 112 and the memory data store 111 either alone or in various combinations may be part of a server system as other external connections. Further, FIG. 1 shows some of the components/data elements of the support architecture 112 and the memory data store 111 as part of an example embodiment of the invention. It shall be apparent to a person skilled in the art that various other elements including data classifiers, data analyzer, data mapper, controllers, API (Application Programming Interface) etc., may be part of the system to execute one or more operations, within the scope of this invention.

Figure 2:
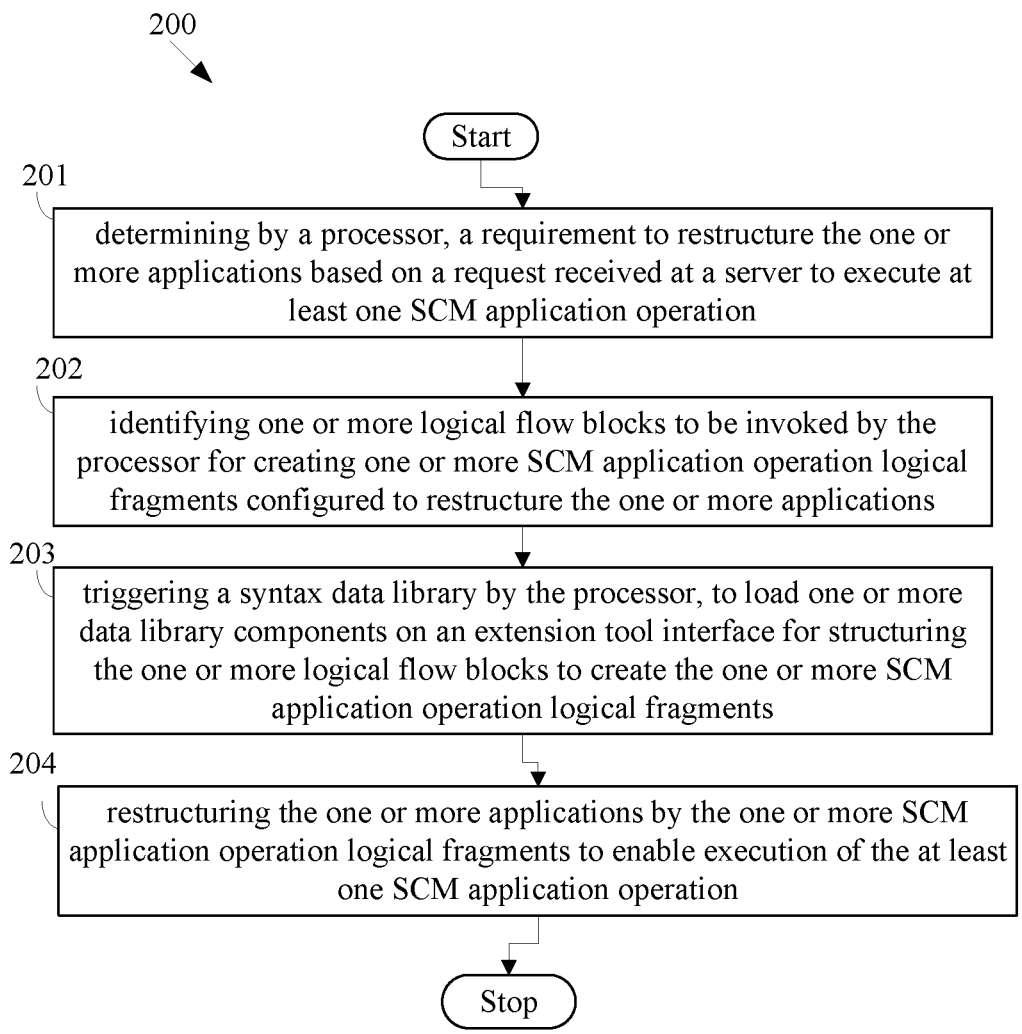
FIG. 2 is a flowchart depicting the method of restructuring one or more application in a codeless platform in accordance with an embodiment of the invention.

Referring to FIG. 2, a flowchart 200 depicting a method of restructuring one or more application in a codeless platform is provided in accordance with an embodiment of the invention. The method includes the steps of 201 determining by a processor, a requirement to restructure the one or more applications based on a request received at a server to execute at least one SCM application operation. In step 202, identifying one or more logical flow blocks to be invoked by the processor for creating one or more SCM application operation logical fragments configured to restructure the one or more applications. In step 203, triggering a syntax data library by the processor, to load one or more data library components on an extension tool interface for structuring the one or more logical flow blocks to create the one or more SCM application operation logical fragments and in step 204, restructuring the one or more applications by the one or more SCM application operation logical fragments to enable execution of the at least one SCM application operation.

In an embodiment, the method of restructuring one or more application further includes the step of identifying by the processor coupled to the AI engine, a plurality of configurable components of a layered codeless platform architecture for restructuring one or more SCM application to execute the SCM operation.

In an embodiment, the SCM operation includes but is not limited to CLM, Inventory management, warehouse management, Cycle Counting, Material transfer, Pick List, warehouse management, Order Management, invoice management, Good Receipts, Credit Memo, service confirmation and timesheet, Goods Issue, Return Note, requisition, Demand and Supply planning, Vendor Performance and Risk Management, RFX, Auction, Project Management, Quality management, Forecast Management, cost modelling, purchase order and sales management, receivables, work order management, Supplier Order Collaboration, Control Tower, Budgeting, Item and Catalog Management.

In an embodiment, the method of restructuring one or more application includes restructuring the one or more applications by the plurality of configurable components and the one or more SCM application operation logical fragment for executing the at least one SCM application operation.

In an embodiment, the extension tool enables the one or more processor to change behavior of the plurality of configurable components based on the one or more logical flow blocks to restructure the one or more applications.

In an embodiment, the syntax data library includes the one or more data library components configured to structure one or more logical flow blocks is created by one or more supply chain domain models wherein the one or more supply chain domain models are conceptual object models configured to incorporate behavior and data related to one or more supply chain applications.

In an embodiment, the one or more supply chain domain models is represented by a supply chain class structure for conceptual modeling of the one or more applications to be structured wherein the supply chain class structure includes one or more code templates configured for creating a plurality of objects, one or more attributes, one or more operations and one or more relationships between the objects.

In an embodiment, the processor coupled to the extension tool is configured to restructure of the one or more application wherein the extension tool supports the logical flow blocks for creation of customized adaptor, creation of customized logical blocks, conversion of object codes to domain model code templates, creation of microservices and API, creation of rules, utilization of expression builder, and creation of approval flows.

In an embodiment, the one or more logical flow blocks are created by an AI engine based on at least one data script where, the at least data script is created by a bot based on one or more SCM logical flows, one or more SCM data object and AI based processing logic for enabling the processor coupled to the AI engine to execute the data script for creating the logical flow blocks.

In another embodiment, the AI based processing includes a processing logic that integrates deep learning, predictive analysis, information extraction, planning, scheduling, optimization and robotics for processing the SCM logical flows.

In an embodiment, the one or more logical flow block includes application programming interface (API) connectors to internal and external elements of a codeless platform, data connectors, rule connectors, UI control behavior, application specific blocks like invoice, Purchase Order, and internet of things (IOT) connectors. Further, the logical flow blocks include front end/UI, workers/Threads of a certain heavy lifting logic; API/Endpoints to interface the wire; entities to represent the subject concern; Stores to interact entities with UI; Components to form a visual experience building block; routable Views to form a routable interactive composition of intended experience; Single page application (SPA) Scopes like a group of scoped (memory-managed) apps, resource allocation; Invokable Pop-ups (Composite-Views)/Federated to form an invokable interactive composition of an experience; Styles/Themes/Locals/WCAG (Web content accessibility guidelines) to-aid-the-formation-of-an-experience; Logic (Blocks/Containers) like the citizen/user customized logic that aid user experience; Events like glue up system/user events with actions; Actions like glue up subjected action to its corresponding task/logic/container; Flows like glue up UI (store-patches/events/actions/containers) selectively according to the flow state machine; Expressions like bocks to build logic as per UI and Data elements similar to Excel Formula; Security/Permissions like blocks to manage security on the data elements e.g. Masking of SSN; Mocking like Validating extension.

In an embodiment, the one or more SCM application operation logical fragment includes Invoice line-item Connectors, PO Data Connectors, Matching Engine Logic blocks, Flip Mapper blocks, Flip Default Data Element blocks, Master Data Elements blocks like Currency, unit of measurement (UOM).

In an embodiment, the one or more components of the syntax data library includes logical components, domain specific components, functional components, data object components and supply chain application components.

In an embodiment, the method of the invention includes generating the extension tool interface as a graphical user interface (GUI), the GUI includes one or more input components for receiving one or more inputs from a user indicating one or more logical flow blocks to be structured within the GUI for creating the one or more SCM application logical fragment to restructure the one or more applications, and processing the one or more inputs for generating an output to be rendered withing the GUI by one or more graphical data elements.

In an exemplary embodiment, the application user interface (UI) and the extension tool user interface of the entity machines enables cognitive computing to improve interaction between user and an enterprise or supply chain application(s). The interface improves the ability of a user to use the computer machine itself. Since, the interface triggers configurable components of the platform architecture along with one or more logical data block of the extension tool for structuring an SCM application to execute at least one operation including but not limited to creation of Purchase order, Contract lifecycle management operations, Warehouse management operations, inventory management operations etc., at the same instant, the interface thereby enables a user to take informed decision or undertake an appropriate strategy for adjusting workflow for execution of operations. By structuring operations and application functions through a layered platform architecture and eliminating multiple cross function layers, repetitive processing tasks and recordation of information to get a desired data or operational functionality, which would be slow and complex, the user interface is more user friendly and improves the functioning of the existing computer systems.

FIG. 3 provides an extension tool interface 300 showing creation of a logical flow block and corresponding xml code in accordance with an example embodiment of the invention. The interface 300 includes logical flow block creation by syntax data library. The extension tool provides component including UI Control, input, field, type, colour, Blockchain logical fragments and blocks, connectors, initiate, success, IOT block, application block including functional operations like PO (Purchase order), invoice, conversation, math and conditional blocks. The name of the logical block, the block type, field, inputs, colour etc. are some of the elements to be described on the extension tool interface to structure the one or more logical blocks as shown in FIG. 3. Using the Extension Tool, Admin user modifies the default behavior of the SCM application say a Purchase order (PO) application. On Submit using API blocks and currency conversion blocks calculation will be made before submitting the PO. Admin is also adding new UI elements with tooltip, color and other attributes. The publish changes component assists in finalizing the changes. The XML tab provides an overview of the underlying code or html version. The admin user only creates the logical flow blocks through the extension tool elements unlike a developer. In case of a Purchase order (PO) as a supply chain management (SCM) application operation, the logical flow blocks like PO number, PO Name, characteristics associated with PO including date created on, currency, contract no. etc., are structured on the extension tool for execution of the operation. The logical flow blocks enable API to connect with one or more sub applications to execute the required SCM operation. Further, the extension tool enables creations of SCM application logical fragment by structuring of the logical flow blocks and extracting historical information including line-item information from one or more data objects in the SCM databases.

In an exemplary embodiment, the blockchain fragments and blocks enable user to connect to various blockchain networks and participate in the transaction. Invoice application can be extended by Admin user to network for invoice payment. Once Payment is made to the supplier, through fragments and logical blocks transaction is sent to the network.

In an embodiment, the process of creation of blocks to consumption of blocks includes predefining platform functionalities, sorting the platform functionalities in namespaces/modules, defining the visual block through extension tool to describe the required functionality, pushing the defined block to the block's gallery along with proper description & category. The new block is accessible to the extension tool interface. Further, the extension tool enables defining a required event, use the new visual block and during the build, extension tool replace the block by the actual predefined text (code). The extension tool enables easy creation of functional statement, variable statement, for loop statement, if statement and expression statement amongst others to structure the logical flow blocks.

FIG. 3A provides an extension tool interface 300A showing creation of logical flow block and corresponding definition code in accordance with an example embodiment of the invention. The interface 300A shows logical flow block for state_delete with input as scopeid, storied, path and value. The definition tab provides an overview of the underlying code.

FIG. 3B provides an extension tool interface 300B showing creation of logical flow block and corresponding generator code tab in accordance with an example embodiment of the invention. The extension tool interface 300B provides logical flow block for state_delete. The generator tab provides an overview of the underlying code showing internal implementation of the resource.

Figure 3C:
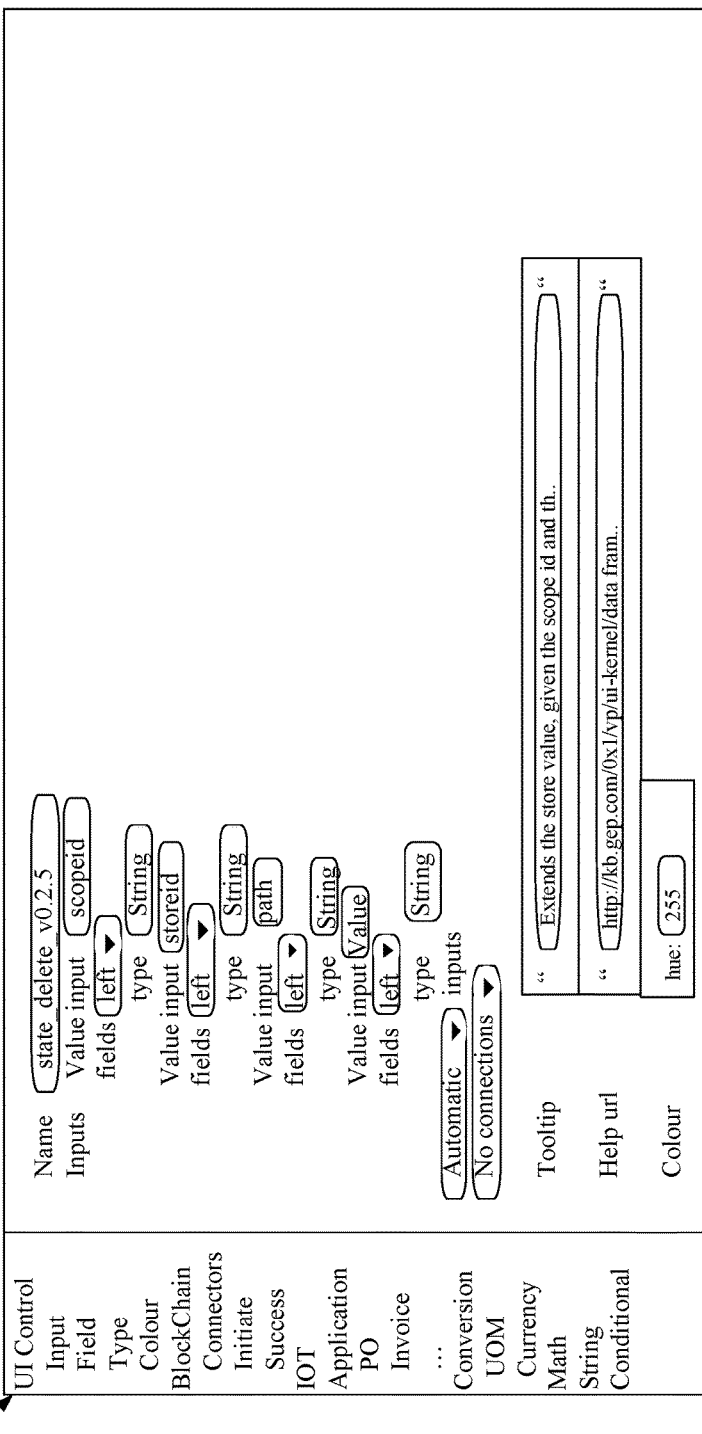
FIG. 3C is an extension tool interface showing creation of logical flow block and corresponding fragment code in accordance with an example embodiment of the invention.

FIG. 3C provides an extension tool interface 300C showing creation of logical flow block and corresponding fragment code tab in accordance with an example embodiment of the invention. The extension tool interface 300C provides logical flow block for state_delete. The fragment tab provides an overview of the underlying code showing internal implementation of the resource.

Figure 3D:
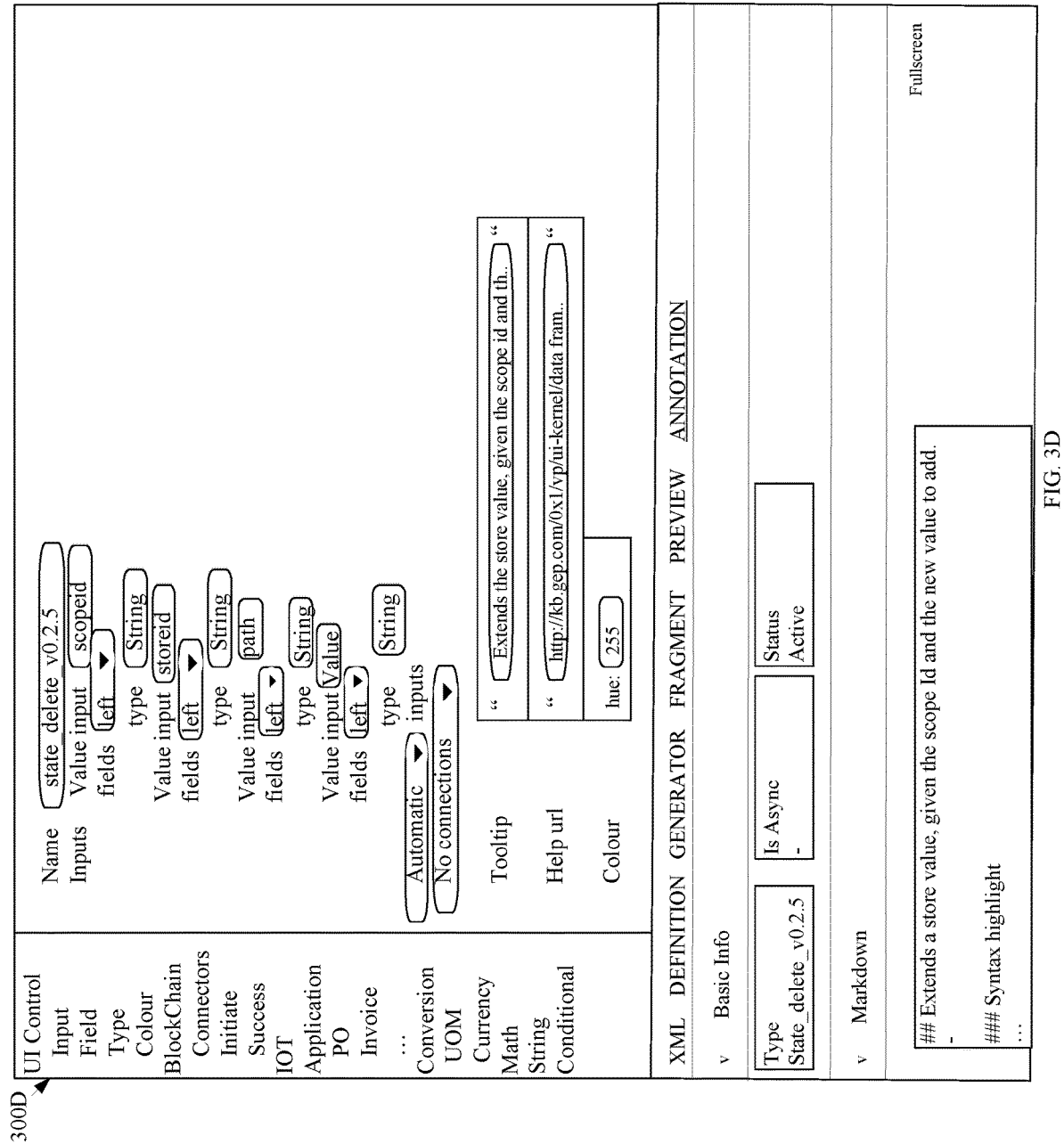
FIG. 3D is an extension tool interface showing creation of logical flow block and corresponding annotation of the one or more application in accordance with an example embodiment of the invention.

FIG. 3D provides an extension tool interface 300D showing creation of logical flow block and corresponding annotation tab of the one or more application in accordance with an example embodiment of the invention. The extension tool interface 300D provides logical flow block for state_delete. The annotation tab provides an overview of the graphical elements on the interface of the admin user and provides internal implementation of the resource.

Figure 4:
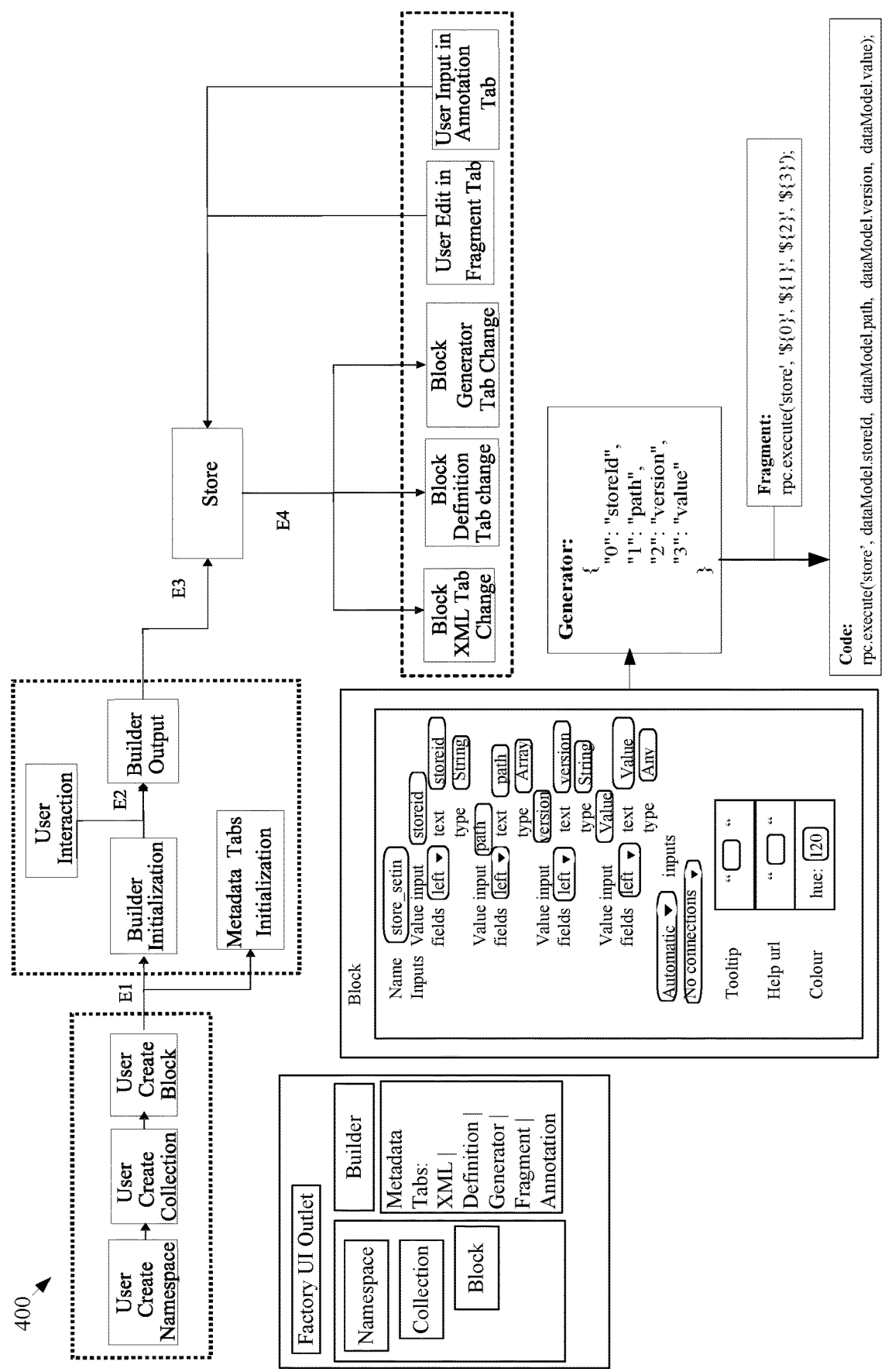
FIG. 4 is a system diagram showing logical flow block creation and corresponding code defining the logical flow block in accordance with an embodiment of the invention.

FIG. 4 provides a system diagram 400 showing logical flow block creation and corresponding code defining the logical flow block in accordance with an embodiment of the invention. The system diagram 400 includes namespace as an identifiable, forkable, publishable/installable, deployable unit of higher order of collection of resources. The system 400 includes collection as an identifiable, forkable unit of virtual organization of resource. It organizes resources in a memory-file\folder-system. The system 400 also includes block as one of the resources that construct an application. It represents a statement of machine learning language. The system includes a container as one of the resources that house N number of blocks to form a function/method. The system also includes factory and designer as resource capable of designing a block resource and a block container resource. Further, the system includes generator, fragment and annotation showing internal implementation of a resource. The block diagram 400 provides E1 as loading extension tool builder panel and metadata panel, E2 as emitting builder event with user operation on extension tool builder, E3 as builder saves metadata (XML, definition, generator) into store and E4 as emit store changes and trigger changes into related tabs XML tab, Definition tab and generator tab.

Figure 4A:
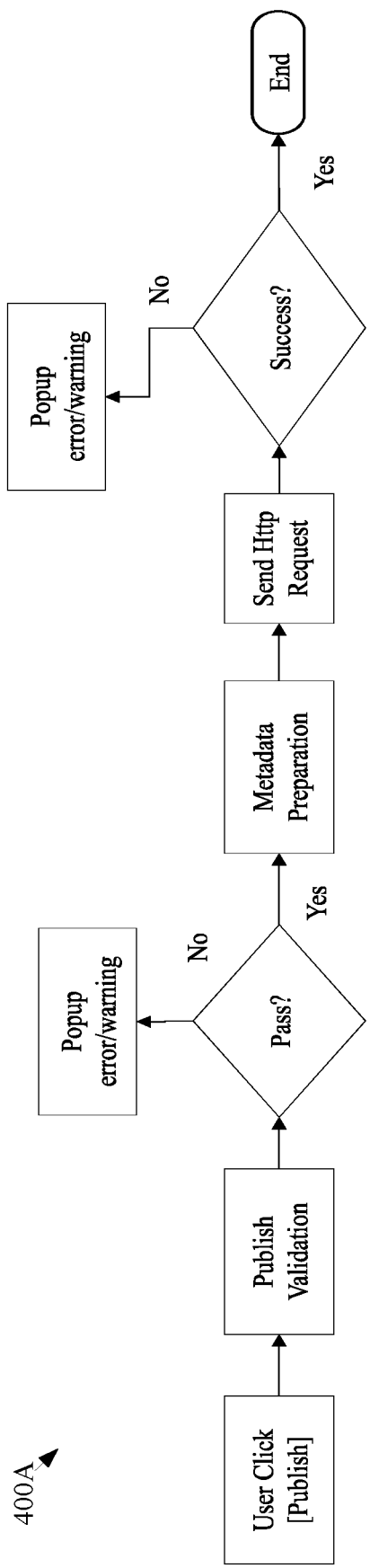
FIG. 4A is a system block diagram showing pushing of the logical flow block to a gallery of the extension tool in accordance with an example embodiment of the invention.

FIG. 4A provides a system block diagram 400A showing pushing of the logical flow block to a gallery of the extension tool in accordance with an example embodiment of the invention. The block diagram 400 A provides validating of configured blocks, generating metadata out of the blocks, pushing the metadata to the gallery and making the block available for consumption.

Figure 4B:
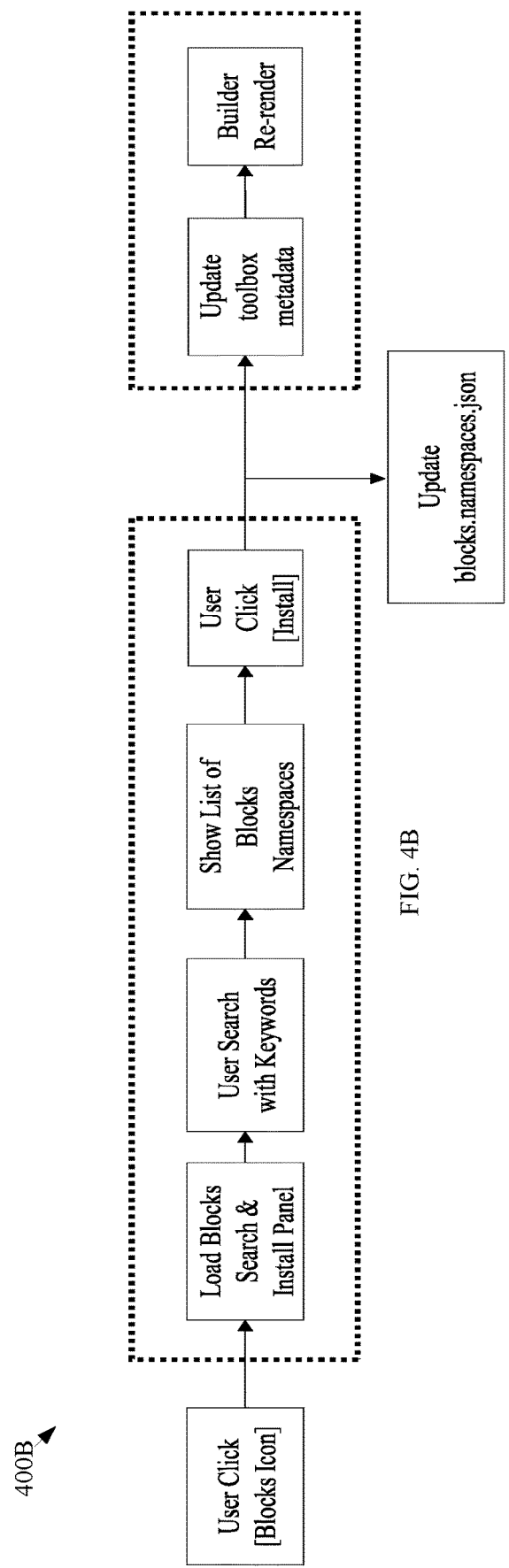
FIG. 4B is a system block diagram showing logical flow block consumption and container creation in accordance with an example embodiment of the invention.

FIG. 4B provides a system block diagram 400B showing logical flow block consumption and container creation in accordance with an example embodiment of the invention. The system block diagram 400B provides deployment of container process that includes validating the configured blocks, generating metadata out of the blocks, run dependencies analysis, generating metadata version, updating the network with new defined container, pushing the metadata to project repository and compiling the metadata to generate the code.

Figure 4C:
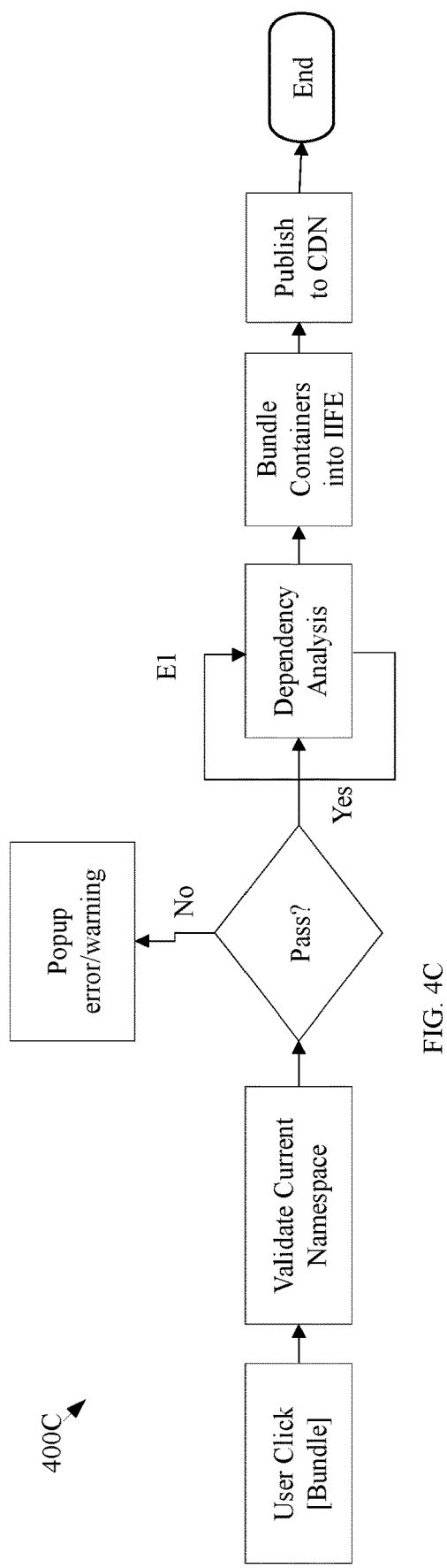
FIG. 4C is a system block diagram showing bundling of containers into target artifacts in accordance with an embodiment of the invention.

FIG. 4C provides a system block diagram 400C showing flow for bundling of containers into target artifacts in accordance with an embodiment of the invention. The system block diagram 400C includes E1 that iterates on all collections/containers and generate a map of {containerId: function}. The diagram 400C includes blocks including user click (Bundle), Validate current namespace, checking if it passes, if no, then pop up error warning, else if yes, then performing dependency analysis, bundling containers into IIFE (Immediately Invoked Function Expression), and publishing to CDN (content delivery network).

Referring to FIGS. 4, 4A, 4B and 4C, the system provides logical flow block creation and mapping with code. The system includes BE/Storage: (Briefed)|Backend & Storage; Edges/Gateways; Middleware; Runtime/Balancing/Invocation; Events; Actions; process management; Microservice/ Micro-Metadata-Controllers; Domain-Model; Validation; Security/Permissions; Testing; Mocking; Storage (+++); and CCC/BE-Kernel.

In a related embodiment, the system provides foundational resources and schematical resources. In foundational resources each item of the abovementioned list (Missing X resources of tomorrow, 3D-Modeling, ML, Ai, MV) represents a foundational-resource that contributes into an application behavior as a (Building-Block) Foundation. Some foundational resources include Logic-Block\\code-fragment, Container/Function of logic (group of code-fragments/blocks), actions, event, process management, microservice, domain-model, entity, DB-schema, locals, styles, themes, workflows. The schematical resources is a publishable\deployable\logical way of grouping resources into in-memory-file/folder(entries)-rooted-by// annotated\identifiable collection//owned by annotated\identifiable (namespace/package/library). Some of the schematical resources include (Namespace\gallery\library) of collections that logically organize resources into a series of entry-system (in-memory-virtual-file-folder) (blocks, containers, components, views, events, actions, models, microservices, process management); Further, additional schematical resources include Namespace-of-resource-type, Collection-of-resource-type etc. The resources are organized in file/folder system, rooted by series of virtual-in-memory logical collections. At least one collection is owned by a deployable/galleried namespace. Also, project is an identifiable resource by itself, that represents group of collections of resources. SPA is another resource that combines one project or more. Deployment project is just another schematical way of describing how subjected resources shall be bundled.

In a related embodiment, the resources cannot be published to gallery\marketplace individually, they must be organized through a series of collections that describe resources in memory-file/folder-system. Deployable\publishable in a form of a namespace. The Marketplace/Gallery House and describe a publishable unit of deployable/installable namespace; It teaches consumer of the namespace consents. The system provides descoping into an individual resource Block/Container a.k.a extension tool.

In an exemplary embodiment, a block is a visual representation of a machine-compatible fragment (code-statement) in a pre-interpretation/compilation form. The block is intended to hide the complexity of a platform/language specific syntax. The block respect the discipline and standardization of URM (Unified Resource Metadata)/URE (Unified Resource Editor). The blocks are nothing but resources treatable in a form of file/folder system rooted by an identifiable/annotated collections owned by an identifiable/annotated/publishable/installable namespace. Further, block as any other resource, cannot be published to marketplace/gallery individually. It must belong to a collection, owned by a namespace. The block namespace can be installed as a dependency to empower a container/function/logic of fragments/code-statements. The extension tool needs fragments and blocks to compile/produce containers/code. The containers are nothing but resources treatable in a form of file/folder system rooted by an identifiable/annotated collections owned by an identifiable, annotated, publishable, installable namespace. The Namespace of containers represents a federated, deployable, installable unit of functionality, and a container of machine language can perform to fulfil a front-end, back-end, process management, and microservice needs.

In an advantageous aspect, the system and method for restructuring of one or more applications of the present invention enable Sourcing, Procurement and Supply Chain to restructure applications with industry seed projects having set of rules and workflow, process flow for various industries like Oil & Gas, FMCG, Finance etc. The system offers admin users of the functional group to configure and customize the applications in different areas with ability to define screen layout and sections as per form template types, ability to configure themes and icons as per customer choice, ability to populate labels and data elements per users' culture and context and Ability to configure rules. The rule configuration for application restructuring to invoke workflows includes mandatory field validation, dependent attributes validation and Parent Child fields, Custom Expression to define field behavior as per state model and action types, operational validations using aggregation and computation logic. The system introduces multiple action types, document states using state machine and state model. Further, the codeless architecture includes task/operation service manager integrated with process engine and workflow through process a orchestrator. The platform support multiple data stores, establishes network of entities, actors and relation of actors with operational objects. The Customization layers enable implementation users to extend code and deploy the code in application server through the extension tool.

In another advantageous aspect, the application is extensible which enables more opportunities for extending and building applications based on organizational requirements. The logical flow blocks are reusable blocks with high maintainability enabling easy tracing of the block in the extension tool, further enables easy quality control, enables usability by non programing users, and the blocks are visually defined. The data is segregated into multiple MicroDBs which makes identification of data points and relation across models difficult. Some of the features include recommendation engine and knowledge based search, access Control policies, analytics on entities, identification of impact analysis in data nodes due to change in new master nodes e.g introduce new category, merge category nodes, Validation engine incase of master data change and master data management.

The present invention uses Artificial intelligence, process orchestration and layered platform architecture where the entire operational logic in the service is transformed into engine reducing complex logic at the back end. The sequence flow is translated in the engine through extension tool. It is very helpful to manage multitenant applications. The system includes both backend and frontend components (UI components, rules engine and workflow) being restructured. The system offers productivity gain and accelerates implementation cycle. The system empowers functional admin to configure UI, add fields, layouts, rule engine and workflows without development efforts. The single page application framework provides better user experience, ability to configure localization and theming from admin portal without engineering support.

In an exemplary embodiment, the present invention may be a platform architecture, application framework, system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

The invention claimed is:

1. A method of restructuring one or more applications, the method comprising:
   determining, by a processor, a requirement to restructure the one or more applications based on a request received at a server to execute at least one SCM application operation;
   identifying one or more logical flow blocks to be invoked by the processor for creating one or more SCM application operation logical fragments configured to restructure the one or more applications;
   triggering a syntax data library by the processor, to load one or more data library components on an extension tool interface for structuring the one or more logical flow blocks to create the one or more SCM application operation logical fragments;
   and
   restructuring the one or more applications by the one or more SCM application operation logical fragments to enable execution of the at least one SCM application operation.

2. The method of claim 1, further comprises:
   identifying, by the processor, a plurality of configurable components of a layered codeless platform architecture for restructuring one or more SCM applications to execute the SCM application operation, wherein the processor is coupled to an AI engine.

3. The method of claim 2, further comprises:
   restructuring the one or more applications by the plurality of configurable components and the one or more SCM application operation logical fragments for executing the at least one SCM application operation.

4. The method of claim 3, wherein the extension tool interface enables the processor to change behavior of the plurality of configurable components based on the one or more logical flow blocks to restructure the one or more applications.

5. The method of claim 1, wherein the syntax data library comprising the one or more data library components configured to structure one or more logical flow blocks is created by one or more supply chain domain models, wherein the one or more supply chain domain models are conceptual object models configured to incorporate behavior and data related to one or more supply chain applications.

6. The method of claim 5, wherein the one or more supply chain domain models is represented by a supply chain class structure for conceptual modeling of the one or more applications to be structured, wherein the supply chain class structure includes one or more code templates configured for creating a plurality of objects, one or more attributes, one or more operations and one or more relationships between the objects.

7. The method of claim 6, wherein the processor coupled to the extension tool is configured to restructure the one or more applications, wherein the extension tool supports the one or more logical flow blocks for creation of customized adaptor, creation of customized logical blocks, conversion of object codes to domain model code templates, creation of microservices and API, creation of rules, utilization of expression builder, and creation of approval flows.

8. The method of claim 7, wherein the one or more logical flow blocks are created by an AI engine based on at least one data script, wherein the at least data script is created by a bot based on one or more SCM logical flows, one or more SCM data objects, and AI based processing logic for enabling the processor to execute the data script for creating the one or more logical flow blocks, wherein the processor is coupled to an AI engine.

9. The method of claim 8, wherein AI based processing by the AI engine includes a processing logic that integrates deep learning, predictive analysis, information extraction, planning, scheduling, optimization and robotics for processing the SCM logical flows.

10. The method of claim 9, wherein the one or more logical flow blocks includes application programming interface (API) connectors to internal and external elements of a codeless platform, data connectors, rule connectors, UT control behavior, application specific blocks like invoice, Purchase Order, and internet of things (IOT) connectors.

11. The method of claim 10, wherein the one or more SCM application operation logical fragments include invoice line-item connectors, purchase order (PO) data connectors, blockchain network connectors, matching engine logic blocks, flip mapper blocks, Flip Default Data Element blocks, master data elements blocks like Currency, UOM.

12. The method of claim 11, wherein the one or more data library components of the syntax data library includes logical components, domain specific components, functional components, data object components, blockchain components, IOT components and supply chain application components.

13. The method of claim 12, wherein the processor is one or more processors configured to:
   generate the extension tool interface as a graphical user interface (GUI), the GUI includes one or more input components for receiving one or more inputs from a user indicating one or more logical flow blocks to be structured within the GUI for creating the one or more SCM application logical fragment to restructure the one or more applications; and processing the one or more inputs for generating an output to be rendered within the GUI by one or more graphical data elements wherein the one or more graphical elements include one or more logical flow blocks, one or more syntax library components and the output.

14. A system for restructuring one or more applications, the system comprising:
   one or more processors;
   at least one memory device coupled to the one or more processors enabling the one or more processors to:
      determine a requirement to restructure the one or more applications based on a request received at a server to execute at least one SCM application operation;
      identify one or more logical flow blocks to be invoked by the one or more processors for creating one or more SCM application operation logical fragments configured to restructure the one or more applications;
      trigger a syntax data library to load one or more data library components on an extension tool interface for structuring the one or more logical flow blocks to create the one or more SCM application operation logical fragments; and
      restructure the one or more applications by the one or more SCM application operation logical fragments to enable execution of the at least one SCM application operation.

15. The system of claim 14, wherein the one or more processors are configured to:
   identify a plurality of configurable components of a layered codeless platform architecture for restructuring one or more SCM application to execute the SCM application operation.

16. The system of claim 15, wherein the one or more processors are configured to:
   restructure the one or more applications by the plurality of configurable components and the one or more SCM application operation logical fragments for executing the at least one SCM application operation.

17. The system of claim 16, wherein the extension tool enables the one or more processors to change behavior of the plurality of configurable components based on the one or more logical flow blocks to restructure the one or more applications.

18. The system of claim 14, wherein the syntax data library comprises the one or more data library components configured to structure the one or more logical flow blocks is created by one or more supply chain domain models, wherein the one or more supply chain domain models are conceptual object models configured to incorporate behavior and data related to one or more supply chain applications.

19. The system of claim 18, wherein the one or more supply chain domain models is represented by a supply chain class structure for conceptual modeling of the one or more applications to be structured, wherein the supply chain class structure includes one or more code templates configured for creating a plurality of objects, one or more attributes, one or more operations and one or more relationships between the objects.

20. The system of claim 19, one or more processors are coupled to the extension tool and the one or more processors are configured to restructure the one or more applications, wherein the extension tool supports the one or more logical flow blocks for creation of customized adaptor, creation of customized logical blocks, conversion of object codes to domain model code templates, creation of microservices and API, creation of rules, utilization of expression builder, and creation of approval flows.

21. The system of claim 20, wherein the one or more logical flow blocks are created by an AI engine based on at least one data script, wherein the at least one data script is created by a bot based on one or more SCM logical flows, one or more SCM data object and AI based processing logic for enabling the one or more processors to execute the at least one data script for creating the one or more logical flow blocks, wherein the one or more processors are coupled to the AI engine.

22. The system of claim 21, wherein the AI based processing includes a processing logic that integrates deep learning, predictive analysis, information extraction, planning, scheduling, optimization and robotics for processing the SCM logical flows.

23. The system of claim 22, wherein the one or more logical flow blocks include application programming interface (API) connectors to internal and external elements of a codeless platform, data connectors, rule connectors, UT control behavior, application specific blocks like invoice, application function block (Purchase Order), and internet of things (IOT) connectors.

24. The system of claim 23, wherein the one or more SCM application operation logical fragments include Invoice line-item connectors, purchase order (PO) data connectors, blockchain network connectors, matching engine logic blocks, flip mapper blocks, flip default data element blocks, master data elements blocks like currency, Unit of measurement (UOM).

25. The system of claim 24, wherein the one or more components of the syntax data library includes logical components, domain specific components, functional components, data object components, blockchain components, IOT components and supply chain application components.

26. The system of claim 25, wherein the extension tool interface is a graphical user interface (GUI) that includes:
   one or more input components for receiving one or more inputs from a user indicating one or more logical flow blocks to be structured within the GUI for creating the one or more SCM application logical fragment to restructure the one or more applications; and
   one or more graphical data elements for rendering within the GUI, one or more logical flow blocks, one or more syntax library components and at least one output obtained by processing of the one or more inputs by the one or more processors.

27. A non-transitory computer program product for restructuring of one or more applications, the computer program product comprising a non-transitory computer readable storage medium having instructions embodied therewith, the instructions when executed by one or more processors causes the one or more processors to:
   determine a requirement to restructure the one or more applications based on a request received at a server to execute at least one SCM application operation;
   identify one or more logical flow blocks to be invoked by the one or more processors for creating one or more SCM application operation logical fragments configured to restructure the one or more applications;
   trigger a syntax data library to load one or more data library components on an extension tool interface for structuring the one or more logical flow blocks to create the one or more SCM application operation logical fragments;
and
restructure the one or more applications by the one or more SCM application operation logical fragments to enable execution of the at least one SCM application operation.

28. The non-transitory computer program product of claim 27, wherein the syntax data library comprising the one or more data library components configured to structure one or more logical flow blocks is created by one or more supply chain domain models, wherein the one or more supply chain domain models are conceptual object models configured to incorporate behavior and data related to one or more supply chain applications.

29. The non-transitory computer program product of claim 28, wherein the one or more supply chain domain models is represented by a supply chain class structure for conceptual modeling of the one or more applications to be structured, wherein the supply chain class structure includes one or more code templates configured for creating a plurality of objects, one or more attributes, one or more operations and one or more relationships between the objects.

30. The non-transitory computer program product of claim 29, wherein the processor coupled to the extension tool is configured to restructure of the one or more application, wherein the extension tool supports the logical flow blocks for creation of customized adaptor, creation of customized logical blocks, conversion of object codes to domain model code templates, creation of microservices and API, creation of rules, utilization of expression builder, and creation of approval flows.

* * * * *